July 17, 1951  F. L. VAN WEENEN ET AL  2,561,000
WOBBLER DRIVE MECHANISM
Filed July 15, 1946
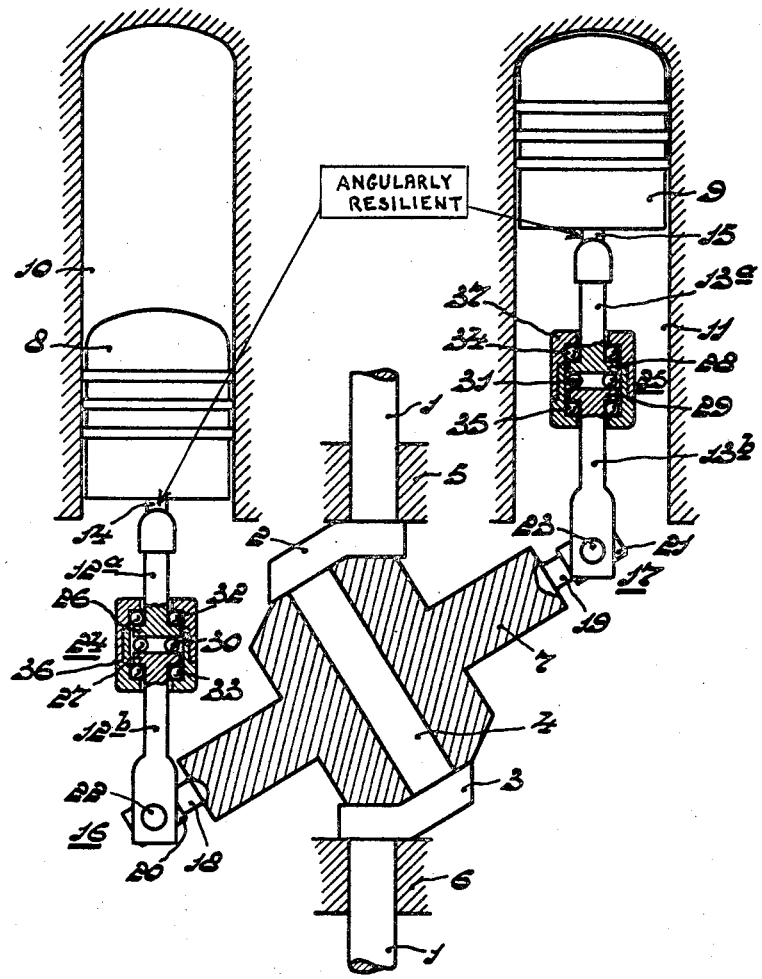
INVENTORS
F.L. VAN WEENEN
AND W.H. STIGTER
by
AGENT Patented July 17, 1951

2,561,000

UNITED STATES PATENT OFFICE 2,561,000

WOBBLER DRIVE MECHANISM

Franciscus Lambertus Van Weenen and Willem Hendrik Stigter, Eindhoven, Netherlands, assignors to Hartford National Bank and Trust Company, Hartford, Conn., as trustee Application July 15, 1946, Serial No. 683,678
In the Netherlands February 21, 1946

3 Claims. (Cl. 74—60)

The driving rods used in wobbling-disc driving mechanisms may be coupled in different manners to the wobbling disc and to the reciprocating bodies, such as pistons, coupled to the wobbling disc by means of the said rods. It is known to utilise ball and socket joints for this purpose. True such joints have three degrees of freedom of motion but they have not given much satisfaction in practice owing to their inability to transfer high powers. Consequently, in engines comprising a wobbling-disc driving mechanism for the coupling of the wobbling disc to the driving rods use is made in certain cases of universal joints which have two degrees of freedom of motion and which are used in such manner that each of the driving rods fixed to the wobbling disc with the aid of such a universal joint can move in two planes passing through the longitudinal axis of the driving rod concerned, which planes mutually make an angle of 90°. This implies that during the operation of the engine the driving rods, owing to the motion which they derive from the wobbling disc, will also slightly turn backward and forward about their axes, with the result that the body fixed to such a driving rod, such as a piston, tends to perform not only the reciprocating movement aimed at but also a rotary motion about its longitudinal axis.

During the operation of the engine utilising such a wobbling-disc driving mechanism the driving rod concerned, owing to this rotary motion, is subjected to a torsional strain by the mass of the said body. When the wobbling-disc mechanism has a high speed, say higher than 500 revolutions per minute, and/or the mass of the body fixed to the driving rod is large, there is a possibility that torsional oscillations occur, which may be disastrous to the driving rods.

The present invention purports to provide means whereby this drawback is met.

The piston engine with wobbling-disc driving mechanism according to the invention, in which the driving rods are coupled to the wobbling disc by means of universal joints, has the characteristic that between these universal joints and the reciprocating pistons there is provided a mechanism such that the pistons can freely rotate, at least through a limited angle, about the centre lines of the associated driving rods.

By proceeding in this manner there is no risk of the pistons performing torsional oscillations that are detrimental to the period of life of the driving rods, since the pistons will adjust themselves at comparatively any arbitrary manner with respect to the driving rods. To obtain the desired action, it is not necessary for the pistons to be able to rotate about the centre lines of the associated driving rods through an unlimited angle; an angle of limited value already suffices.

For obtaining the desired effect, one may proceed in different manners. Thus, it is possible to divide the driving rods into two parts and to make one part, together with the pistons fixed to it, freely rotatable at least through a limited angle with respect to the other portion of the driving rod, which is coupled to the wobbling disc by means of a universal joint. According to one advantageous form of construction, the pistons are fixed to the driving rods so as to be freely rotatable on them.

In order that the invention may be clearly understood and readily carried into effect, it will now be explained more fully with reference to the accompanying drawing.

The drawing shows diagrammatically a piston engine with wobbling-disc driving mechanism, reference numeral 1 denoting the main shaft of the engine having mounted on it two flanks 2 and 3, which protrude in opposite directions and which are firmly interconnected by means of an inclined portion 4 of the shaft. The main shaft 1 is supported in bearings 5 and 6. The wobbling disc 7 is fixed on the portion 4 of the shaft so as to be freely rotatable on it. The bearings between the portion 4 of the shaft and the wobbling disc 7 are omitted for simplicity's sake. A certain number of pistons are coupled to the wobbling disc 7 by means of driving rods, two of these pistons denoted by 8 and 9, being shown in the drawing. The pistons 8 and 9 are movable in cylinders 10 and 11 (shown diagrammatically) the centre lines of which are parallel to each other and parallel to the centre line of the main shaft 1. The pistons 8 and 9 are coupled to the wobbling disc 7 by means of driving rods 12a—12b and 13a—13b. The driving-rod portions 12a and 13a are coupled to the pistons 8 and 9 by means of resilient elements 14 and 15 which permit the connecting rods to assume an angle relative to the center lines of the pistons. Stated in other words, the elements 14 and 15 are bendable in any direction at an angle to the main longitudinal axes thereof, whereby the last stated operation is possible.

The universal joints 16 and 17 are constituted by pins 18 and 19 respectively, which are firmly secured in the wobbling disc 7 and on which sleeves 20 and 21 can rotate freely. At points located diametrically opposite each other the sleeves are furnished with projecting pins of which only those denoted by 22 and 23 are shown in the drawing. The driving rods 12 and 13 are rotatable about these pins.

Since the universal joints 16 and 17 have but two degrees of freedom of motion, the driving rods 12 and 13, if no particular precautions are taken, owing to the movement imparted to them by the movement of the wobbling disc 7, will perform not only a reciprocating movement but also a reciprocating rotary motion and the latter motion, if it would be imparted to the pistons might lead to disastrous consequences for the life of the driving rods particularly at high speeds of the engine. In order to meet this drawback, in this embodiment of the invention the driving rods 12 and 13 are divided into two parts interconnected by means of couplings 24 and 25, which are realised in such manner as to transfer solely a reciprocating movement but no rotary motion from one driving-rod portion to the other connected by means of such a coupling. For this purpose the driving-rod portions 12a—12b and 13a—13b exhibit flangelike portions 26, 27 and 28, 29 respectively, a ball ring 30 being located between the opposite terminal surfaces of the driving rod portions 12a and 12b and a ball ring 31 between the adjacent terminal surfaces of the driving rod portions 13a and 13b. Furthermore, as can be seen from the figure, there are provided ball rings 32, 33, 34 and 35, which are kept together by clamping bushes 36 and 37, each of which is constituted by two parts. Consequently, the couplings thus obtained transfer solely the reciprocating movement of the driving-rod portions 12b and 13b on to the driving-rod portions 12a and 13a (and hence on to the pistons 8 and 9), the reciprocating rotary motion of the driving-rod portions 12b and 13b not being transferred.

As a matter of fact, the said couplings may alternatively be mounted at different places, notably at the places where the driving rods are fixed to the pistons.

What we claim is:

1. A piston device comprising a wobbling-disc driving mechanism, a plurality of piston masses each reciprocable along the respective center line thereof, a plurality of driving rods each of a substantially rigid construction in the axial direction and each operatively connected at one end thereof to an associated one of said reciprocable piston masses by a laterally resilient means for allowing that each of said connecting rods may assume an angle relative to the said center lines of each of said piston masses, respectively, a plurality of universal joint means each coupling said wobbling-disc to the other end of each of said plurality of driving rods, and each of said rods comprising a plurality of other means each located between the two ends thereof for dividing each of said rods into two portions and permitting relative bodily rotational movement between said two portions.

2. A piston device comprising a wobbling-disc driving mechanism, a plurality of piston masses each reciprocable along the respective center line thereof, a plurality of driving rods each of a substantially rigid construction in the axial direction and each operatively connected at one end thereof to an associated one of said reciprocable piston masses by a laterally resilient means for allowing that each of said connecting rods may assume an angle relative to the said center lines of each of said piston masses, respectively, a plurality of universal joint means each coupling said wobbling-disc to the other end of each of said plurality of driving rods and each of said rods comprising a plurality of other means each located between the two ends thereof for dividing each of said rods into two portions and permitting relative bodily rotational movement between said two portions, said other means each including a ball ring coupling.

3. A piston device comprising a wobbling-disc driving mechanism, a plurality of piston masses each reciprocable along the respective center line thereof, a plurality of driving rods each of a substantially rigid construction in the axial direction and each operatively connected at one end thereof to an associated one of said reciprocable piston masses, respectively, a plurality of universal joint means each coupling said wobbling-disc to the other end of each of said plurality of driving rods, each of said joint means allowing only two degrees of motion for the end of each of said driving rods connected to said wobbling-disc and preventing turning of each of said driving rods about the axes thereof with respect to said wobbling-disc, and means in each of said rods between the ends thereof for dividing each of said rods into two portions and permitting each of the said piston masses operatively associated therewith to freely rotate with the portion of said rod connected thereto at least through a limited angle about the center line of the said associated rod.

FRANCISCUS LAMBERTUS VAN WEENEN.
WILLEM HENDRIK STIGTER.

REFERENCES CITED

The following references are of record in the file of this patent:

UNITED STATES PATENTS

| Number | Name | Date |
|---|---|---|
| 273,699 | Altham | Mar. 13, 1883 |
| 712,805 | Judson | Nov. 4, 1902 |
| 790,374 | Maxwell | May 23, 1905 |
| 893,558 | Williams | July 14, 1908 |
| 924,787 | Janney | June 15, 1909 |
| 1,432,059 | Fullington | Oct. 17, 1922 |
| 1,623,928 | Lewellen et al. | Apr. 5, 1927 |
| 1,745,310 | Novick | Jan. 28, 1930 |
| 1,867,385 | Schlenker | July 12, 1932 |
| 1,956,922 | Ingram | May 1, 1934 |